July 24, 1962 R. C. SIBLEY 3,046,446

MAGNETRON TUNER

Filed Aug. 12, 1960

INVENTOR
ROBERT C. SIBLEY
BY S E Olson
ATTORNEY 3,046,446

MAGNETRON TUNER

Robert C. Sibley, Williamsport, Pa., assignor to Sylvania Electric Products Inc., a corporation of Delaware Filed Aug. 12, 1960, Ser. No. 49,208
8 Claims. (Cl. 315—39.61)

This invention relates to tunable magnetrons and more particularly to tuners for multi-cavity resonator magnetrons in which plungers or pins are inserted in the resonators to effect the tuning thereof.

In tunable magnetrons, an anode structure has been used which comprises a plurality of semi-circular bores arranged in a circular array and separated by radial vanes extending inwardly toward a central cathode. Tuning of the magnetron is achieved by a like plurality of plungers, normally fastened to a common ring, positioned to be inserted to a greater or lesser degree into the resonators. The tuner pins may be cylindrical in shape, and heretofore guide sleeves external of the evacuated envelope have been employed to prevent contact between the tuner pins and the walls of the resonators. In view of the close spacing which must be maintained between the pins and the walls of the resonator, the external guides have necessarily been made with extreme accuracy and usually are fairly massive and of large volume. The space taken up by the guide sleeves adds to the length of the tuner pins which causes the pins to have mechanical resonances at relatively low frequencies when subjected to vibration and shock which, in turn, causes frequency modulation of the output spectrum. Frequency variations and unwanted frequency modulations of this type are obviously undesirable. Moreover, with the pins supported remotely from the anode region, heat generated in the tuning pins when the tube is in operation must be dissipated by conduction along the pins into the tuner mechanism. Expansion of the parts of the latter usually lags in time the response of other parts of the resonator resulting in a greater amount of time after start of oscillations to stabilize the frequency.

It is an object of this invention to provide a tuner which will appreciably improve the ruggedness of tunable magnetrons.

Another object of this invention is to provide a magnetron tuner assembly which is essentially resonant free so as not to require the usual devices for mode control in tuners such as straps and chokes.

Another object of the invention is to provide a magnetron tuner assembly which is mechanically self-positioning in the anode region of the magnetron so as to eliminate the complex assembly of jigging and guiding mechanisms outside the vacuum envelope required with tuners of the prior art.

Still another object of the invention is to provide a tuner which may be cooled by conduction and convection to reduce the thermal lag which is characteristic of prior art inductive tuners.

A further general object of the invention is to provide a magnetron tuner assembly which is capable of severe environmental conditions.

According to a feature of this invention, the tuner assembly comprises a plurality of conductive pins mounted on the circumference of a cylindrical drive sleeve so as to flare to a large diameter at the free ends of the pins. The pin assembly is forced into a contact ring secured to one end of the resonant anode system which compresses the free end diameter to cause each pin to be spring loaded outwardly against one or more contact points on the ring. In one specific embodiment, the contact ring is broached to have V-shaped notches centered over respective anode cavities, the tuner pin being urged against two sharply defined contact points at the sides of the V. The notches are oriented with respect to the anode cavity beneath it to space the pins from the walls of the resonator into which it extends. This structure provides radial and circumferential mechanical support for the tuner assembly, and heat generated in the tuning pins is conducted directly to the anode block, which is normally air cooled. Tuning of the magnetron is achieved by driving the pin assembly in a direction parallel to the magnetron anode axis. With the tuner pins contacting the anode near the free ends of the pins the tolerances on the concentricity of the drive mechanism with the axis of the anode may be an order of magnitude greater than may be tolerated in the usual type of inductive tuner.

It has been found that by use of this construction a magnetron tunable in the range between 8500 and 9600 megacycles is able to withstand a vibration of 5 *g*'s from 5 to 500 cycles per second, with less than plus or minus one megacycle of frequency modulation.

Other objects, features and advantages of the invention will be apparent from the following description taken in conjunction with the accompanying drawing, in which.

Figure 3:
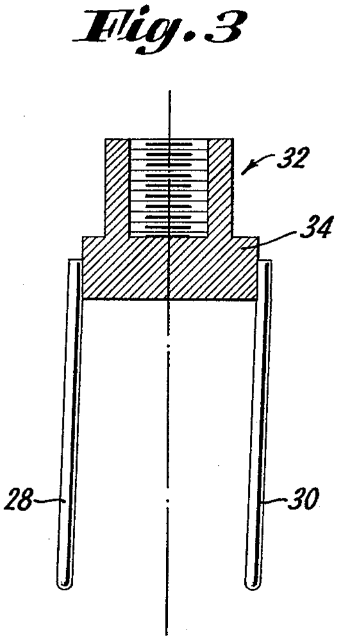
FIG. 3 is a cross-sectional view of the tuner assembly of the magnetron of FIG. 1, showing only two of the pins.

Turning now to the drawing, the magnetron in which the invention is incorporated comprises an anode 10 having an axial bore 12 and a plurality of cavity resonator bores 14 and 16 of semi-circular shape equally spaced in a circular array around the axial bore 12 and communicating therewith. A cathode 18 comprising a cylindrical sleeve having an electron emissive coating thereon is positioned within the axial bore 12 and supported by a high voltage bushing, partially shown at 20. The upper end of the cylindrical cathode sleeve is positioned within the axial bore 22 of the upper pole piece 26, a similar pole piece being contained within the cylindrical structure 20 at the other end of the cathode. Tuning pins 28 and 30, best seen in FIGS. 2, 3 and 4 and described further below, extend into the cavity resonator bores 14 and 16 and are axially insertable therein by a tuning mechanism 32 which includes a circular conductive tuning ring 34 around the periphery of which the tuning pins are equally spaced. The tuning pins 28 and 30 (and additional pins for the other anode resonators) extend through cylindrical openings 36 and 38 arranged in a circle in the upper pole piece 26 and through openings aligned therewith in end filler 40. End filler 40 is essentially a short cylinder, preferably formed of copper, having a concave-shaped central bore conforming in shape to the lower end of the upper pole piece 26. The tuning pins pass with clearance through the circular array of openings in the end filler 40 with the exception of tuning pin 30 which extends into the resonator from which energy is coupled, in this case the pin making contact with the inner surface of the opening in the end filler as will be more fully explained in connection with FIG. 2. Energy from the magnetron is transmitted from one of the cavity resonator bores, bore 16 in the illustration, through a waveguide system comprising an H-section transformer 42 and a window waveguide circuit in a manner well known to the art.

Figure 1:
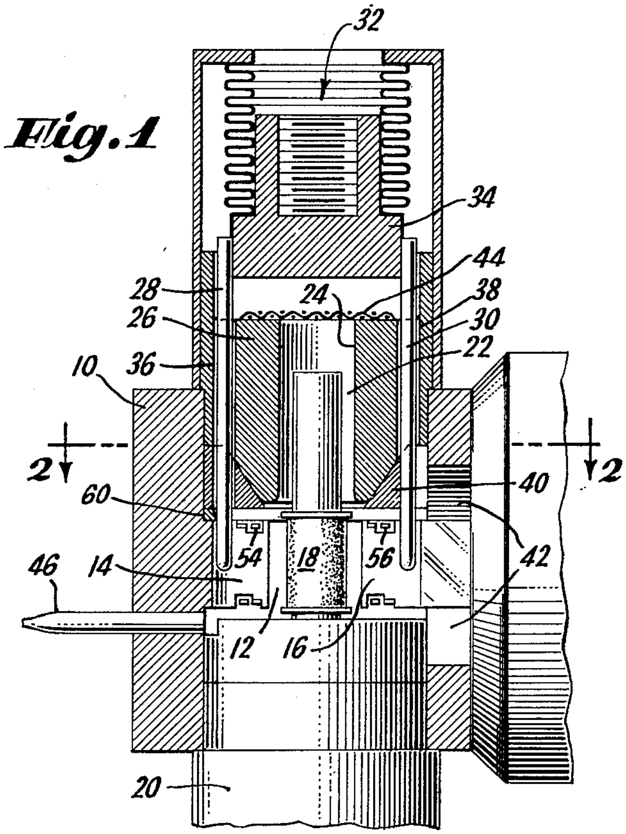
FIG. 1 is a sectional view of a tunable magnetron in which this invention may be incorporated.

Tuning of the magnetron is accomplished by varying the extent of insertion of the tuning pins into the cavity resonator bores. At the low frequency end of the tuning range the pins are essentially withdrawn from the resonators, and at the high frequency end the tuning pins extend almost to the bottom of the resonators as viewed in FIG. 1.

Contrary to the usual tuner of the inductive type wherein great effort is made to prevent any contact between the tuner pins and the walls of the resonators, which has been accomplished only at the expense of objectionable external guide sleeves for the pins, the tuner pins in accordance with this invention make firm electrical contact with the anode structure at sharply defined contact points at the upper ends of the resonators as they are axially inserted into the anode block. The anode is formed with semi-circular resonators 14, 16, etc. equally spaced around the back wall of the anode structure, as best seen at 50 and 52, and conducting vanes brazed to the projections between the resonators extend radially inward toward the cathode as shown. The axial length of the vanes corresponds to the length of the anode block as depicted in the region adjacent resonators 50 and 52. In the illustrated embodiment, the anode is strapped in a manner now well known to the art by a pair of concentric conducting rings 54 and 56, the inner ring 54 being secured to alternate ones of the vanes and passing over cutouts 58 in the intermediate vanes, and the outer ring 56 passing over the intermediate vanes to which the inner ring is secured and joined to the vanes to which the inner ring is not connected. Similar strapping rings are also affixed to the other end of the anode, in this case, the straps being secured to the vanes which the corresponding rings pass over at the end shown in FIG. 2.

Figure 4:
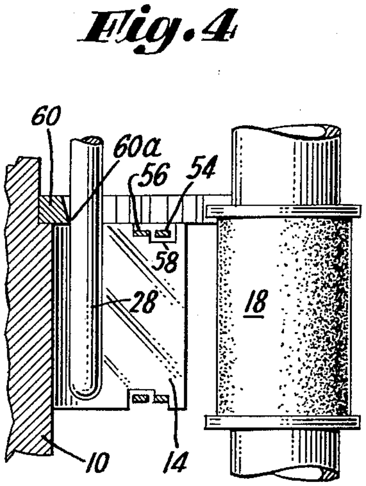
FIG. 4 is a fragmentary elevation view, in section, of a portion of the anode block illustrating the positioning of the tuner pins in the resonator cavities.

The tuning pins are positioned and guided into their respective resonators by a washer type ring 60 which is brazed to the upper end surface of the anode block (as viewed in FIG. 1) and partially covering the semi-circular resonators. More particularly, the ring 60 is broached after being brazed to the anode block, to have modified V-shaped notches 62, 64, 66, 68 each centered over a respective anode cavity. The bottom of each notch is positioned slightly inward from the back wall of the resonator and the sides of the V, in effect, define chords of the semi-circular resonator whereby the inner edges of the V-shaped cutout lie inwardly from the resonator wall. As viewed from the top in FIG. 1, the slots are tapered inwardly approximately 5 degrees with respect to the vertical to facilitate the insertion of the tuning pins. As the tuner assembly is inserted further, the pins pick up the taper and make contact at two sharply defined points at opposite sides of the V along the edge of the taper immediately above the resonator over which it is positioned. As best seen in FIG. 4, when the pin is inserted it contacts the edge 60*a* of the ring and is spaced inwardly from and out of contact with the back wall of the resonator beneath the ring 60. The final positioning of the tuner pins relative to the wall of the resonators is further illustrated at resonators 50 and 52 in FIG. 2. The firm contact of the tuner pins with the two sharply defined contact points above each of the resonators provides radial and circumferential mechanical support for the tuner assembly, provides heat conduction paths from the tuner pins to the anode block which is normally air cooled, and provides electrical contact between the tuner and the anode block which assures a tuner "Q" nearly equal to one over the entire frequency range of the magnetron.

To insure maintenance of contact of the tuning pins at two points on their respective V-shaped cutouts regardless of wear, creepage of material, or lack of concentricity of its driving mechanism, the tuner is so fabricated that its normal outer diameter at the places of contact is larger than the internal part on which it is to slide. This feature is illustrated in exaggerated fashion in FIG. 3, the tuning ring 34 being shown in cross-section along the diameter including pins 28 and 30, and only these two pins shown in the interest of clarity. The pins are formed of a material which will not anneal, so as to prevent creepage at the fabrication temperatures and in later usage of the magnetron, and may be of round cross-section as illustrated. Tungsten has been found to be an eminently satisfactory material for the tuner pins. The tuner is assembled by holding the pins, with the exception of pin 30, against a cylindrical sleeve with a split ring and tapered retaining ring, the pins being supported vertically in their correct angular positions by a splined sleeve within the retaining ring. With the pins thus held in position, a tapered plug is inserted into the splined sleeve, the plug having a taper so as to flare the pins slightly outwardly toward the free ends of the pins, a flare in the amount of .010 inch per lineal inch along the pins having proven satisfactory. With the pins jigged in position, the assembly including the rings 34 is brazed together, preferably in a hydrogen furnace with silver, copper, or gold brazing alloys. After brazing, fifteen of the pins (for the illustrated sixteen resonator case) are flared outwardly as shown at 28, the amount of flare obviously being exaggerated in this drawing. Thus, when the tuned is forced into place within the notched ring 60, the assembly will compress with each pin spring loaded against the sides of its respective notch.

Figure 2:
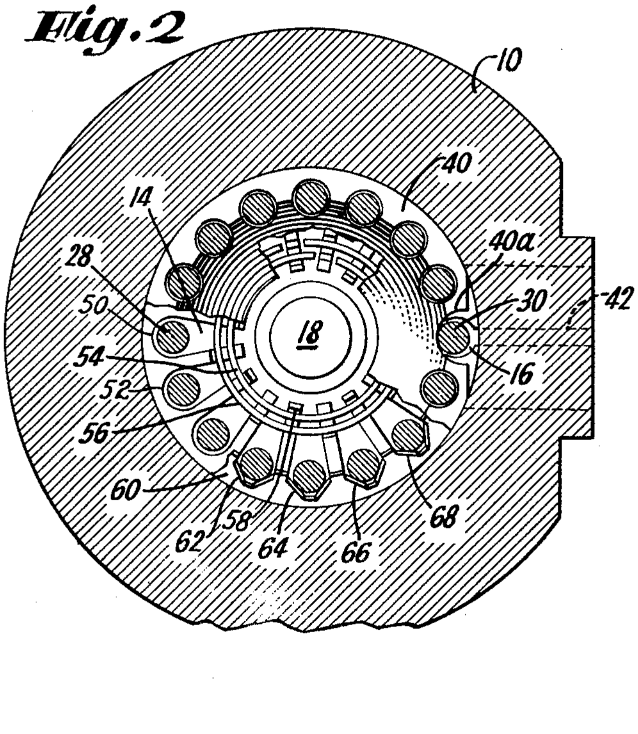
FIG. 2 is a fragmentary sectional view, taken along line 2—2 of FIG. 1, with the upper pole piece removed.

So as not to short out the output gap 42, pin 30 which projects into resonator 16 is arranged to make electrical contact with the anode block through end filler 40 which is fitted on top of ring 60. As was mentioned earlier, the tuning pins extend through openings arranged in a circle in the upper pole piece 26 and through aligned openings in the end filler 40. As shown in FIG. 2, the opening 40*a* opposing the output gap 42 and which receives pin 30 extends to the periphery of the end filler 40 and is of slightly larger diameter than the openings for receiving the balance of the pins. Further, pin 30 is arranged to contact the innermost surface of the opening 40*a*, making electrical contact therewith and to the anode block. Again referring to FIG. 3, firm contact is maintained between pin 30 and the inner wall of opening 40*a* by assembling pin 30 on ring 34 so as to be flared inwardly as shown. Thus, as the tuner is inserted into the anode, pin 30 is spring loaded against the end filler 40 and as has been noted, the other pins are spring loaded against their respective notches in ring 60.

It will be appreciated that with this configuration, the tuner pins are supported at one end within the anode itself and at the other end by the tuner drive structure. This rigid positioning of the tuner pins causes mechanical resonant frequencies of the tuner structure to be much higher than in prior art magnetrons, in which the tuner pins are supported and guided remotely from the anode, which provides a ruggedness not heretofore realized in tunable magnetrons. Moreover, the positioning of the pins in close proximity to the resonators eliminates the previous requirement for external guide sleeves, with their attendant close tolerances, to control the spacing between the pins and the walls of the resonators. Also, the internal contacts between the pins and the anode structure provide a thermal path to conduct the heat generated in the tuning pins directly to the anode block, which is usually air cooled.

While there has been described what is now considered to be a preferred embodiment of the tuner positioning structure, other types of guiding structures which maintain the positioning of the pins centrally of the resonator cavities may be employed without departing from the spirit of the invention. For example, instead of the notched ring 60, a smooth ring having an inner diameter lying slightly inwardly from the back walls of the resonators may be used with a flared tuner assembly to maintain the pins in proper position within the resonator. A smooth ring would not afford the circumferential positioning provided by the notched ring, but proper tolerances can be achieved by accuracies in the assembly of the tuning structure and the assembly for positioning the tuner in the anode. A smooth ring need not be brazed to the anode but merely fitted within the anode block.

It is to be understood that the invention is not limited to the embodiment as described above which is shown for purposes of illustration only.

What is claimed is:

1. A tunable magnetron comprising a cathode, an anode block surrounding said cathode and having a plurality of cavity resonators each formed by radial vanes and a substantially cylindrical back wall, a conductive annular ring secured to one end of said anode block concentrically with said cathode, the inner diameter of said ring lying slightly inwardly from said cylindrical back walls, a tuning mechanism comprising a tuning ring axially movable with respect to said cathode and anode and a like plurality of tuning pins mounted on said tuning ring and axially movable therewith, each of said pins extending into a corresponding one of said resonators, said pins flaring outward from said tuning ring whereby the normal diameter of the circle defined by the free ends of said pins is larger than the inner diameter of said annular ring whereby said pins are urged into electrical, mechanical and thermal contact with the inner diameter of said annular ring and each spaced from the cylindrical back wall of its respective resonator.

2. A tunable magnetron comprising a cathode, an anode block surrounding said cathode and having a plurality of cavity resonators each formed by radial vanes and a substantially cylindrical back wall, a conductive annular ring secured to one end of said anode block concentrically with said cathode, the inner diameter of said ring lying slightly inwardly from said cylindrical back walls, a tuning mechanism comprising a tuning ring axially movable with respect to said cathode and anode and a like plurality of tuning pins mounted on said tuning ring and axially movable therewith, each of said pins extending into a corresponding one of said resonators, said pins flaring outward from said tuning ring whereby the normal diameter of the circle defined by the free ends of said pins is larger than the inner diameter of said annular ring whereby said pins are urged into electrical, mechanical and thermal contact with the inner diameter of said annular ring and each spaced from the cylindrical back wall of its respective resonator, and means secured to said tuning ring for moving said pins relative to the corresponding resonators to vary the effective inductance of said resonators.

3. A tunable magnetron comprising a cylindrical cathode having an axis, a cylindrical anode surrounding said cathode and including a plurality of cavity resonators each formed by a substantially semi-circulator cylindrical back wall and radial vanes extending toward said cathode, a conductive annular ring secured to one end of said anode concentrically with said cathode, said annular ring being formed with a like plurality of notches equally distributed around the inner diameter thereof, said notches being centered over the cylindrical back walls of their respective resonator with the sides thereof disposed inwardly of the back wall, and a tuning mechanism comprising a circular tuning ring axially movable with respect to said anode and a like plurality of tuning pins secured at one end to said tuning ring, said pins flaring outward from said tuning ring whereby the normal diameter of the circle defined by the other ends of said pins is larger than the diameter of the circle defined by the bottoms of said notches, each of said pins extending into a corresponding one of said resonators from said one end of said anode and being urged into firm mechanical, thermal and electrical contact with the sides of a respective notch, the sides of said notches spacing the pins from said cylindrical back wall.

4. A tunable magnetron comprising a cylindrical cathode having an axis, a cylindrical anode surrounding said cathode and including a plurality of cavity resonators each formed by a substantially semi-circular cylindrical back wall and radial vanes extending toward said cathode, a conductive annular ring secured to one end of said anode concentrically with said cathode, said annular ring being formed with a like plurality of notches equally distributed around the inner diameter thereof, said notches being centered over the cylindrical back wall of its respective resonator with the sides thereof disposed inwardly of the back wall, a tuning mechanism comprising a circular tuning ring axially movable with respect to said anode and a like plurality of tuning pins secured at one end to said tuning ring, said pins flaring outward from said tuning ring whereby the normal diameter of the circle defined by the other ends of said pins is larger than the diameter of the circle defined by the bottoms of said notches, each of said pins extending into a corresponding one of said resonators from said one end of said anode and being urged into firm mechanical and electrical contact with the sides of a respective notch, the sides of said notches spacing the pins from said cylindrical back wall, and means secured to said tuning ring for moving said pins relative to said anode to vary the effective inductance of said resonators.

5. A tunable magnetron comprising a cylindrical cathode, a cylindrical anode surrounding said cathode and including a plurality of cavity resonators each formed by a substantially semi-circular cylindrical back wall and radial vanes extending toward said cathode, a conductive annular ring secured to one end of said anode concentrically with said cathode, said annular ring being formed with a like plurality of substantially V-shaped notches centered over respective ones of said resonators with the sides thereof lying along chords of said semi-circular back wall, a tuning mechanism comprising a tuning ring and a like plurality of tuning pins secured at one end to said ring and equally spaced around the periphery thereof, said pins flaring outward from said tuning ring whereby the normal diameter of the circle defined by the free ends of said pins is larger than the diameter of a circle passing through the mid-points of the sides of said V-shaped notches, each of said pins extending into a corresponding one of said resonators from said one end of said anode and being urged into firm electrical, thermal and mechanical contact with said annular ring at two sharply defined points one on each side of a respective notch, said points being disposed inwardly from said semi-circular back wall whereby said pins are spaced from said back wall, and means secured to said tuning ring for moving said pins relative to said anode to vary the effective inductance of said resonators.

6. Apparatus in accordance with claim 5 wherein said notches are tapered toward said cathode in the direction from said one end to facilitate insertion of said pins into said resonators and sharply define said points of contact.

7. A tunable magnetron comprising a cylindrical cathode, a cylindrical anode surrounding said cathode and including a plurality of cavity resonators each formed by a substantially semi-circular cylindrical back wall and radial vanes extending toward said cathode, means including a a gap communicating with one of said resonators through the back wall thereof for coupling energy from said anode, a conductive annular ring secured to one end of said anode concentrically with said cathode, said annular ring being formed with a like plurality of substantially V-shaped notches centered over respective ones of said resonators, except said one resonator, with the sides thereof lying along chords of said semi-circular back wall, a tuning mechanism comprising a tuning ring and a like plurality of tuning pins secured at one end to said tuning ring equally spaced around the periphery thereof, said pins except one flaring outward from said tuning ring whereby the normal diameter of the circle defined by the free ends of said pins is larger than the diameter of a circle passing through the mid-points of the sides of said V-shaped notches, an annular end filler positioned adjacent said one end of said anode having a like plurality of axial openings therein aligned with said resonators, said pins extending with clearance through said openings in said end filler and into a corresponding one of said resonators and all except the pin extending into said one resonator being urged into firm electrical and mechanical contact with said annular ring at two sharply defined points one on each side of a respective notch, said points being disposed inwardly from said semi-circular back wall whereby said pins are spaced from said back wall, the pin extending into said one resonator contacting said end filler, and means secured to said tuning ring for moving said pins relative to said anode to vary the effective inductance of said resonators.

8. A tunable magnetron comprising a cylindrical cathode, a cylindrical anode surrounding said cathode and including a plurality of cavity resonators each formed by a substantially semi-circular back wall and radial vanes extending toward said cathode, means including a gap communicating with one of said resonators through the back wall thereof for coupling energy from said anode, a conductive annular ring secured to one end of said anode concentrically with said cathode, said annular ring being formed with a like plurality of substantially V-shaped notches equally distributed around the inner periphery thereof, said notches being centered over respective ones of said resonators, except said one resonator, with the sides thereof lying along chords of said semi-circular back wall, a tuning mechanism comprising a circular tuning ring and a like plurality of conductive tuning pins secured at one end to said tuning ring equally spaced around the periphery thereof, said pins, except one, flaring outwardly from said ring such that the normal diameter of a circle defined by the free ends of said pins is larger than the diameter of a circle passing through the mid-points of the sides of said V-shaped notches, an annular end filler formed of conducting material positioned adjacent said one end of said anode, said end filler having a plurality of axial openings therethrough aligned with said resonators, said tuning pins, except the pin associated with said one resonator, extending with clearance through said openings into a corresponding one of said resonators and urged into firm electrical, mechanical, and thermal contact with said annular ring at two sharply defined points on each side of a respective notch, said points being disposed inwardly from said back wall whereby said pins are spaced from and centered with said back wall, the opening in said end filler aligned with said one resonator extending to the outer perimeter of said end filler, the tuning pin extending into said one resonator being flared inwardly thereby to be urged into firm electrical, mechanical and thermal contact with the inner wall of the opening in said end filler, and means secured to said tuning ring for moving said pins relative to said anode to vary the effective inductance of said resonators.

References Cited in the file of this patent

UNITED STATES PATENTS

| | | |
|---|---|---|
| 2,450,619 | Sonkin | Oct. 5, 1948 |
| 2,906,920 | Crapuchettes | Sept. 29, 1959 |